(12) United States Patent
Choudhuri (10) Patent No.: US 10,080,970 B2
(45) Date of Patent: Sep. 25, 2018

(54) GPS TRACKING WITH MAP OVERLAY

(71) Applicant: Antoni Choudhuri, San Francisco, CA (US)

(72) Inventor: Antoni Choudhuri, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 316 days.

(21) Appl. No.: 15/075,935

(22) Filed: Mar. 21, 2016

(65) Prior Publication Data

US 2017/0266564 A1 Sep. 21, 2017

(51) Int. Cl.
*A63F 13/795* (2014.01)
*A63F 13/216* (2014.01)
*A63F 13/335* (2014.01)
*A63F 13/35* (2014.01)
*A63F 13/92* (2014.01)

(52) U.S. Cl.
CPC .......... *A63F 13/795* (2014.09); *A63F 13/216* (2014.09); *A63F 13/335* (2014.09); *A63F 13/35* (2014.09); *A63F 13/92* (2014.09); *A63F 2300/8082* (2013.01)

(58) Field of Classification Search
USPC ........................................................ 463/42
See application file for complete search history.

(56) References Cited

U.S. PATENT DOCUMENTS

| 8,449,396 | B2* | 5/2013 | Craine | A63F 13/12 463/29 |
| 8,845,428 | B2* | 9/2014 | Khan | H04L 67/38 463/31 |
| 2012/0015739 | A1* | 1/2012 | Craine | A63F 13/795 463/42 |
| 2017/0182422 | A1* | 6/2017 | Etter | A63F 13/65 |

\* cited by examiner

*Primary Examiner* — Pierre E Elisca
(74) *Attorney, Agent, or Firm* — Donald R. Boys; Central Coast Patent Agency, LLC (57) ABSTRACT

A game system has one or more network-connected servers executing system software (SSW) on one or more processors from a non-transitory medium, providing virtual reality games for players logged in to the system to select and play, and a plurality of mobile digital devices in use by players logged in to the system, associated by the system with individual player identity, executing a mobile application (MA) enabled to interact with the SSW, and equipped with GPS tracking. The MA reports GPS coordinates for individual ones of the plurality of players to the SSW periodically, and the SSW identifies clusters of players based on pre-programmed geography limitations, and uses cluster data for various interactions between players and the system, and between players and other players.

17 Claims, 4 Drawing Sheets

GPS TRACKING WITH MAP OVERLAY

BACKGROUND OF THE INVENTION

1. Field of the Invention

The present invention is in the field of consumer online gaming, and pertains more particularly to methods and apparatus for accomplishing friendships between two or more game players having local proximity to one another during game play.

2. Discussion of the State of the Art

In the field of interactive online gaming, players subscribe to a game provider service in order to play interactive games on the Internet. Such services often involve membership services and include social interaction services that players may utilize to connect with one another in chat, game play, club membership, and the like.

A player playing a game online may "friend" one or more other players by sending a friend request to another player. The other player may accept friendship or decline or ignore the request. In many instances players play games but do not friend other players while gaming. However, it may be desired by a gaming service provider to have more friendships established amongst game players in order to promote a more rewarding experience for players, which will encourage continued game play and increase the online presence of game service members.

In many circumstances game players are minors under the age of eighteen who may have restrictions on befriending other players who may be adults of either sex, which might make a friendship between them and a minor inappropriate at least on face value. In such cases a friendship might be appropriate when the adult is a mentor, teacher, or otherwise known to the minor and supportive of the minor. However, in other cases such friendships may be regarded as suspect.

In some social interaction services not relative to online gaming, a provider may suggest friendships based upon existing friendship status of a player, such as suggesting to friend a person who is a friend of a friend, for example. Such notifications may appear in a panel or window with an option to send the player a friend request. However, this is passive and no intelligence for suggesting such a friendship is available or forthcoming from the service.

Therefore, what is clearly needed is a method and apparatus for recommending friendships to a target player playing an online game, based upon attribute commonalities found between the players and game play geographic proximity between the players.

BRIEF SUMMARY OF THE INVENTION

In one embodiment of the present invention a game system is provided, comprising one or more network-connected servers executing system software (SSW) on one or more processors from a non-transitory medium, providing virtual reality games for players logged in to the system to select and play, and a plurality of mobile digital devices in use by players logged in to the system, associated by the system with individual player identity, executing a mobile application (MA) enabled to interact with the SSW, and equipped with GPS tracking. MA reports GPS coordinates for individual ones of the plurality of players to the SSW periodically, and the SSW identifies clusters of players based on pre-programmed geography limitations, and uses cluster data for various interactions between players and the system, and between players and other players.

In one embodiment one function of the SSW is to facilitate establishing formal friendship between players, and recommendations are made by the SSW to individual players regarding suitability of other players to be friended, based in part on the cluster data. Also in one embodiment the recommendations are made to individual players through messages in real time to the mobile digital devices in use by the players. Also in one embodiment the system maintains profile information for individual players, including but not limited to name, age, and gender, and wherein friendship recommendations are based on the profile information as well as cluster data. Also in one embodiment the SSW maintains geographic information associated with GPS coordinates for a variety of enterprises and institutions, and processes the cluster data as associated with specific enterprises and institutions.

In one embodiment of the system the SSW, based on repetitive association of two players in a cluster associated with an institution, assumes that the two players are members of the institution, and uses the institution association together with compatibility of profile data to initiate friendship recommendation. Also in one embodiment recommendations made comprise an interactive interface enabling a recipient of the recommendation to issue a friend request to the player recommended through a message to the device in use by the player recommended or through a different message channel. Also in one embodiment a player receiving a plurality of friend recommendations from the system is enabled to select all or individual ones of the recommended players to issue group invitations. Also in one embodiment the geographic information is provided by a third-party mapping service. And in one embodiment the SSW selects and targets a specific player, notes the specific player's GPS position, and searches GPS data for other players within a pre-programmed range of the targeted player.

In another aspect of the invention a method is provided, comprising executing system software (SSW) on one or more processors in one or more network-connected servers from a non-transitory medium, providing virtual reality games for players logged in to the system to select and play, tracking a plurality of mobile digital devices in use by players logged in to the system, associated by the system with individual player identity, the mobile devices executing a mobile application (MA) enabled to interact with the SSW, and equipped with GPS tracking, reporting GPS coordinates for individual ones of the plurality of players to the SSW periodically, identifying clusters of players based on pre-programmed geography limitations, and using cluster data for various interactions between players and the system, and between players and other players.

In one embodiment of the method the SSW facilitates establishing formal friendship between players, and makes recommendations to individual players regarding suitability of other players to be friended, based in part on the cluster data. Also in one embodiment the recommendations are made to individual players through messages in real time to the mobile digital devices in use by the players. Also in one embodiment the method comprises maintaining profile information for individual players, including but not limited to name, age, and gender, and making friendship recommendations based on the profile information as well as cluster data. In one embodiment the method further comprises maintaining geographic information associated with GPS coordinates for a variety of enterprises and institutions, and processing the cluster data as associated with specific enterprises and institutions.

In one embodiment the method comprises using repetitive association of two players in a cluster associated with an institution, assuming that the two players are members of the institution, and using the institution association together with compatibility of profile data to initiate friendship recommendation. In one embodiment the method comprises enabling a recipient of the recommendation to issue a friend request to the player recommended through a message to the device in use by the player recommended or through a different message channel. In one embodiment the method comprises enabling a player to select all or individual ones of the recommended players to issue group invitations. In one embodiment the method comprises using geographic information provided by a third-party mapping service. And in one embodiment the method comprises selecting and targeting a specific player, noting the specific player's GPS position, and searching GPS data for other players within a pre-programmed range of the targeted player.

DETAILED DESCRIPTION OF THE INVENTION

In various embodiments described in enabling detail herein, the inventor provides a unique system recommending friendships to targeted online game players based in part on shared attributes and in part on Geo-proximity between the targeted and recommended players during incidents of game play. The present invention is described using the following examples, which may describe more than one relevant embodiment falling within the scope of the invention.

Figure 1:
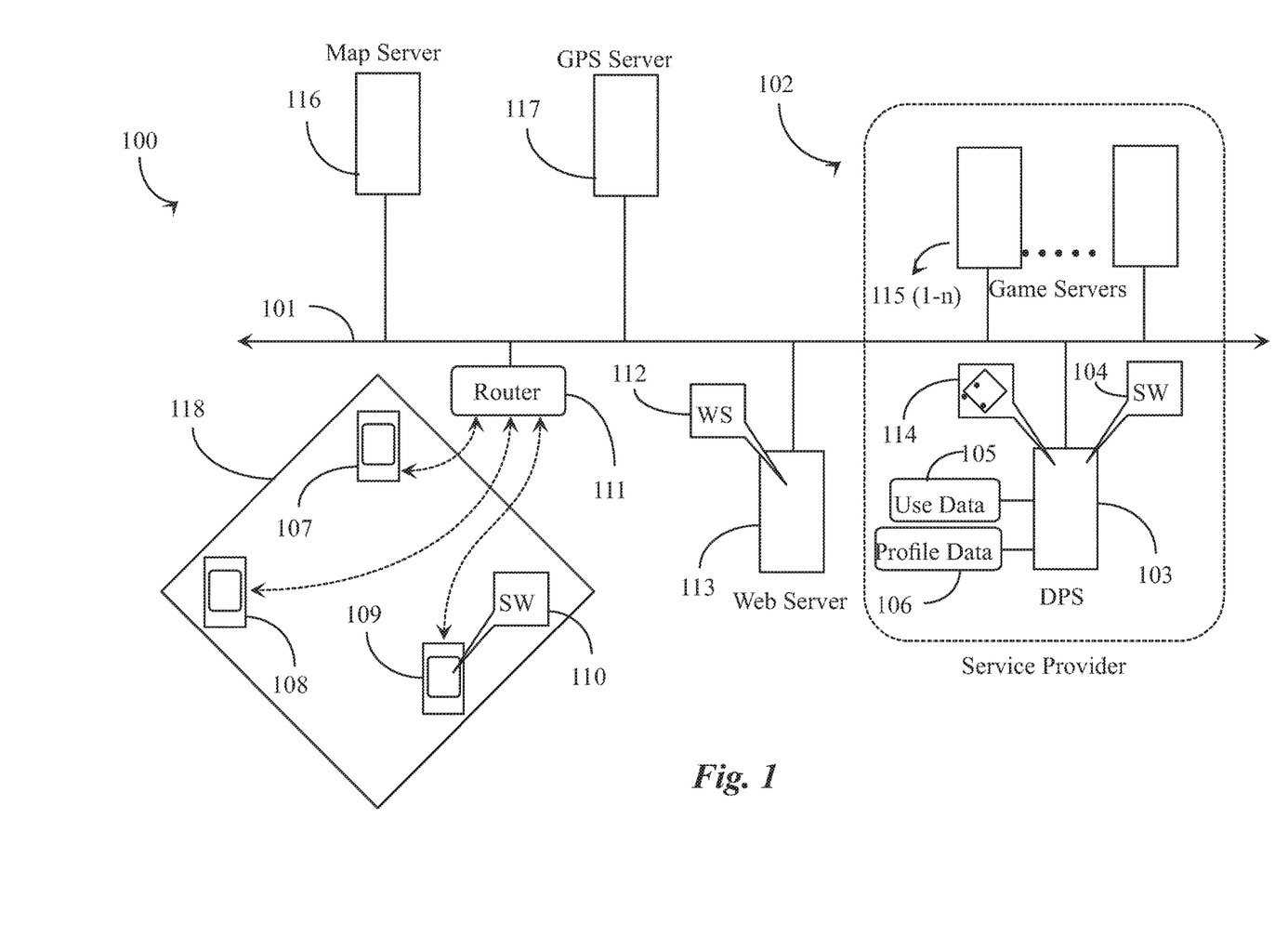
FIG. 1 is an architectural overview of a gaming network supporting notification of friend suggestions to targeted players in an embodiment of the present invention.

FIG. 1 is an architectural overview of a gaming network 100 supporting notification of friend suggestions to targeted players based in part on geographic proximity between the players and in part on common attributes shared between the players. Gaming network 100 includes the well known Internet network illustrated by a network backbone 101. Backbone 101 represents all of the lines equipment and access points that make up the Internet as a whole including any connected sub-networks. Therefore, there are no geographic limitations to the practice of the present invention.

Backbone 101 supports a gaming service provider domain 102. Provider domain 102 includes the equipment and software required to provide online gaming services to consumers who subscribe to such services, typically through a Website. Providing organization 102 may maintain a Website (WS) 112 hosted on a Web server 113 supported by backbone 101 in this example. Server 113 may be a third-party Web hosting service or an in-house Web hosting service without departing from the spirit and scope of the present invention.

Website 112 is a contact point between gaming service subscribers and provider 102. Website 112 enables search and browse of available games and may advertise featured or highly popular games. Website 112 enables secure access and connection to at least one game server. In this example, service provider domain 102 includes game servers 115 (1-$n$). Game servers 115 (1-$n$) may be maintained within a physical location of the service provider or they may be cloud-based and distributed over a larger geographic region. In a preferred implementation they are distributed and players connect to the server that is open and closest to the accessing player's geographic position in the network, partly for latency reduction purposes.

Backbone 101 supports at least one data router 111 that may bridge a wireless data network to the wired Internet network 101 through a wireless service provider and a wireless carrier network. In this implementation, connection to game server(s) 115 (1-$n$) in domain 102 may be through router 111 from a wireless network, such as a wireless cellular network, enabling players using gaming devices depicted herein as devices 107, 108, and 109 to engage in online game play. Devices 107, 108, and 109 may be any wirelessly-capable computing appliance or phone having browser-based capability of accessing WS 112 to be redirected to one or more of gaming servers 115 (1-$n$).

Gaming device 109 has a mobile software (SW) application 110 executable for the purpose of simplifying and specializing gaming experience according to an embodiment of the invention. It may be assumed in this example that gaming devices 107 and 108 also include an instance of SW 110 executable therefrom. Application 110 may be acquired by download from WS 112 hosted on Web server 113, or in other ways. Application 110, among other tasks, is capable of periodically reporting Global Positioning Satellite (GPS) coordinates of the host device (109) during active play of an online game selected through mobile application 110 while connected to WS 112. Mobile application 110 is capable of site navigation on the internet network.

Backbone 101 supports a data back-end processing server within domain 102 of the service provider. Data processing sever 103 records play history of subscribing players such as those operating devices 107, 108, and 109. Data processing server 103 hosts a software application 104 that may be a parent or sister application to mobile application 110 on device 109. Application 104 enables server 103 to receive reported information about the gaming activity and certain other attributes of players operating devices 107, 108, and 109 through one or more gaming servers 115(1-$n$), and from connected devices such as device 109 executing their versions of mobile application 110. Player attributes may include but are not limited to player age, gender, and name. Other more detailed attributes might also be available under player profile information, for example, clubs the player belongs to, school affiliation, and so on.

Processing server 103 may receive game server feeds of data, including games being played, identities of players playing the games and times and durations of playing games. This player profile information is part of each player's game-site profile that may be created during registration at Website 112 for game play. Such player attributes may be stored on Web server 112 and on associated local gaming devices of those players.

In one implementation the player attribute information is held in a cloud database service and is available to authorized entities such as the service providing entity (102). In one implementation processing server 103 receives and stores data in connected data repositories. Game use data may be retrieved (pulled) from or fed to (push) one or more game servers 115 (1-*n*) and stored in a connected data repository 105, labeled use data. Use data in repository 105 may be purged from the repository after a specified period of time or at a specified maximum load of data.

In specific implementations game use data includes GPS coordinates for the device used by each player engaging in game play at any time. For example, if a player Billy is playing a game, Billy's GPS coordinates are reported by the device Billy uses at the time Billy engages a game. These GPS coordinates may be updated if Billy changes his location while gaming. This is particularly important in the circumstance where Billy may be using a mobile device, and may be changing locations with the device.

Backbone 101 supports a GPS server 117 adapted to provide general GPS services for any players having electronic devices connected online. In order to practice the invention, players must have GPS tracking on their devices turned on in order to report location of those players when operating their devices online or on a network. GPS data from game players is used by SW 104 to help identify clusters of players that are in relatively close proximity to on another when they are playing. For example, by "targeting" one player with known GPS, the system may "look for" other players currently playing a game or that have recently played a game in close proximity to the targeted player.

Gaming use data may include actions by players that are not directly related to game play, such as befriending other players, messaging other players, and chatting with other players during game play, among other possible actions. In one implementation this data may be part of the data received from one or more game servers 115 (1-*n*) if the communication functionality is supported by a game played. In one implementation a player may request to be friends with another player directly through a game that both players are playing. Such activity may be contained in the game activity feed available from the one or more of the game servers.

Processing server 103 has a data repository 106 connected thereto and labeled profile data. Profile data 106 may include profile information about players that are subscribers to the gaming service. Such profile data may include name, gender, age, and club or group membership indication for groups supported within the gaming community. It is noted herein that profile information for younger persons may be restricted to certain tuples like name, age, and gender. However, school affiliations and indication of clubs or groups a player belongs to may also be included if that information is known and protected by the service provider.

Like use data repository 107, profile data in repository 106 may be limited to profile data for players currently actively playing a game. The profile information may be forwarded to server 103 whenever such players engage in game play at one of servers 115 (1-*n*). Profile information from repository 106 is used to determine profile commonalities between players that are determined to have the same or geographically close GPS coordinates as plotted on a mapping of an area.

Backbone 101 further supports a mapping server 116. Mapping server 116 may be a third-party service provider that may be capable to serve a geographic rendering of a locality based on submission of a range of two or more GPS coordinates. SW 104 is adapted in one implementation to discern, against certain constraints, whether one targeted game player and another player having similar GPS coordinates should be friends. GPS coordinates and common attributes may be shared between the game players.

In general practice of the present invention and in one implementation, a mobile game player such as one operating device 109 aided by a version of mobile application 110 may connect over the network to server 113 and authenticate at WS 112 to play a game. The player may select a game to play after logging in through mobile application 110. Once the player selects a game to play and enters the game, the player's device reports GPS coordinates from tracking server 117 to server 103 and SW 104. In one implementation the GPS coordinates are made part of the server gaming feed or "use data" that the server may temporarily store in repository 107.

SW 104 may be adapted to target a player, such as a player operating through device 109, aided by mobile application 110. A player may be targeted to determine if there are other players within a pre-programmed "local proximity" to the targeted player. If so, the SW may run a comparison of attributes shared between the targeted player and any players found within the proximity range programmed. The constraint of proximity may be preset such that a "cluster" of player GPS coordinates may be associated with a "locality" such as a school campus, a park, a sports stadium, a city square, a mall, or other recognizable locality that may be rendered geographically be mapping server 116.

In this implementation a locality 118 is depicted from within which players are operating devices 107, 108, and 109 aided by versions of Mobile application 110. Device 109 is the current targeted device. Each of devices 107 and 108 are also assumed playing or have recently played a game from within the same locality as defined by a GPS coordinate range as the targeted player. Each of devices 107 and 108 have reported GPS at the time of game selection and play. It is noted herein that GPS reporting may be adapted to occur periodically via application 110. Thus when SW 104 targets device 109, it obtains access to the player identity, the identity of the game the player is engaged in or has recently been engaged in, the GPS coordinates of the device, and at least the age and gender of the player as reported in profile data available to server 103.

In one implementation, SW 104 may launch a search of data repository 105 containing "use data" using the targeted player's GPS coordinates as a search criterion and using the preset range (GPS boundary) around the targeted player's GPS coordinates. Use data from repository 105 may have GPS coordinate data associated with "other" players operating devices 107 and 108. Thus in a search of use data SW 104 may identify players operating devices 107 and 108 in this example. In one implementation profile data includes "friends" lists for each player. Next, SW 104 may search profile data contained in repository 106 by player identification to access the attributes and current "friends" status of each player relative to the other players.

If the targeted player using device 109 in this example is not already friends with players operating devices 107 or 108, SW 104 may take a comparison of attributes between the targeted player and the "found" players and weigh against certain constraints whether there are enough commonalities between the targeted player and one or more of the other players to recommend to the targeted player to "friend" one or more of the other players. A recommendation may be generated at server 103 aided by SW 104 in the form of a notification and sent to device 109 aided by application 110, the notification including identification of one or more other players that the gaming service provider recommends the player to friend. Interactive links to request friendship over the network may be accessed through the list of one or more players. The player receiving the recommendation may opt to friend or not to friend any other player.

In one implementation a "locality" having a healthy appearance of players may be saved by SW 104 as a potential target or hot spot to start GPS searching for new players or players previously not discovered there. Such newly discovered players may be "targeted" by SW 104 for the purpose of suggesting friendships citing other local players. Locality information may reveal place names of where players are regularly gathering and recommending friendships helps to keep players motivated in play and helps attract more potential players to engage the service from a logical marketing standpoint, although it is important that the suggested friendships contain the correct shared attributes to a degree the friendship is appropriate and comfortable for the players enriching their experience with the service.

Figure 2:
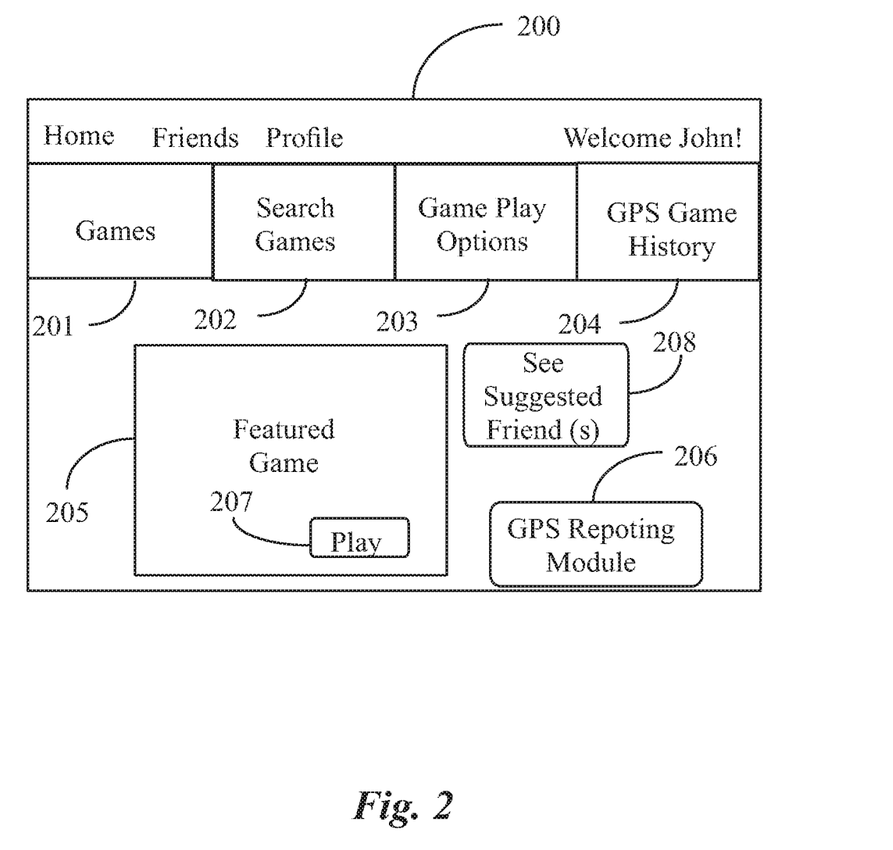
FIG. 2 is a screen view of a mobile application screen of a gaming application of FIG. 1.

FIG. 2 is a screen view of an example mobile application screen 200 of gaming application 110 of FIG. 1. Application screen 200 represents a mobile-friendly platform for players to connect to a gaming service and play games from a wireless network-capable mobile device such as devices 107 through 109 of FIG. 1. Screen 200 may be one of more than one navigable screens a mobile player may access through application (110).

Screen 200 includes a navigation bar including navigation options of Home, Friends, and Profile representing just a few of possible options for navigation in the mobile application. The Friends option allows a player to see a list of gaming friends the player has made through friend request sending and through acceptance of incoming friend requests. The profile option allows the player to create and update profile information and to set permissions on who may see or access that information. Screen 200 may be customized according to player preferences.

A player interacting in screen 200, which may be a "Home" screen or page of the mobile application, may select a navigation option Games 201 and bring up a subsequent screen depicting a list of games to which the player has access. In one embodiment the player may see most recent games played, games played most often, and games suggested to the player by the service provider. The player may search for games in the gaming system using a search option 202, which upon selection may bring up a search field for entering game search criteria. A player may see and select game play options for a particular game through selection of Game Play Options 203. Some options may be preselected while some are selectable after a game has been selected for play. In one implementation, a player may view game play GPS history by selecting GPS Game History 204. Game play History 204 may depict a GPS-tracked history including the time, date, and game title, and the "locality" (named location) based on the GPS signature of the player while the game was being played.

In one implementation one or more featured games 205 may be presented to a player through screen 200. A player may select and initiate play of a featured game by clicking on a play or enter option 207, or the display portion 205 may be a link. Application (110) may include a transparent GPS reporting module 206 that may be adapted to work in the background to report GPS position of a mobile game player. In one implementation module 206 reports GPS of an active player to the service provider periodically wherein those GPS coordinates are associated with a particular game being played and that may be appended to the gaming use or activity data.

In one implementation GPS reporting occurs periodically beginning from the time a player has entered a game until the player has logged off from the server. In this implementation the player may switch games (play more than one) while logged onto the server while GPS is continually reported on a periodic basis. In one implementation, GPS may be reported when the player first enters a game and may not be updated unless the coordinates change during the time the player is logged onto the system. In one implementation GPS reporting is continual, such as when a player is mobile and moving while playing a game. There may be other options depicted in and available through screen 200 than are illustrated in this example without departing from the spirit and scope of the present invention such as a log in and log out option, a chat button to enable messaging or chat with other online players, etc.

Profile information about a player may be stored locally on the player's device and or at a WS database such as WS 112 of FIG. 1. The profile information may be made available to the back-end data processing system of the service provider (server (103) whenever the player is logged in to play a game. Attributes in the profile section of a player are compared to those of other players the system may be considering as potential acceptable gaming friends for a targeted player. For example, if a targeted player and another player have the same or very close GPS coordinates and the gender, age, education level, and game types being played are similar, the system might send a notification to the targeted player recommending that the player friend the suggested player. There may be referenced, in a single friending notification, a list of players that could potentially be friended that are recommended to the targeted player as potential good gaming friends. It is noted herein that certain attributes about the games being played such as levels attained, skill levels of the players, language (English or other) used in the game may also be considered in a comparison algorithm executed to compare the attributes between players and a targeted player to recommend friending of other players to the targeted player.

In one implementation notification sent by the service provider to a player may appear as pop-up notification 208 in screen 200. A player may select the pop-up to see a list of one or more potential friends the system has found and has qualified as a potential good gaming friend for the player. Such notification may contain one or more friend request links enabling the targeted player to request friendship immediately through the notification window, such requests sent from mobile application to mobile applications used by the potential friends. It is noted herein that practice of the invention is not strictly limited to friend notifications being sent only via the mobile gaming applications. Notifications may also be sent through other channels that may exist between the mobile device and the service provided such as a messaging channel or an email channel, among others.

In one implementation where a notification may contain a list of more than one potential friend, an option to friend all of the suggested friends may be presented so that the targeted player may request friendship of all of the friends using one click. In another implementation each listed potential friend may have a check box adjacent to the tuple to allow the targeted player to select a number of potential players before clicking on a "send requests" button that generates a requests for friendship to each selected player. In one implementation, a player may call up a potential friend's profile for quick review before deciding to select the potential friend for request. In the same fashion the targeted player may receive friendship requests from other targeted players.

It is noted herein that one commonality for all of the players that may be included in a "friending search" result is that they all are playing or have recently played games in close proximity to one another at a defined locality such as a park, a cinema, a school, or other type of venue, as determined by a service that may relate GPS coordinates to localities and structures.

Figure 3:
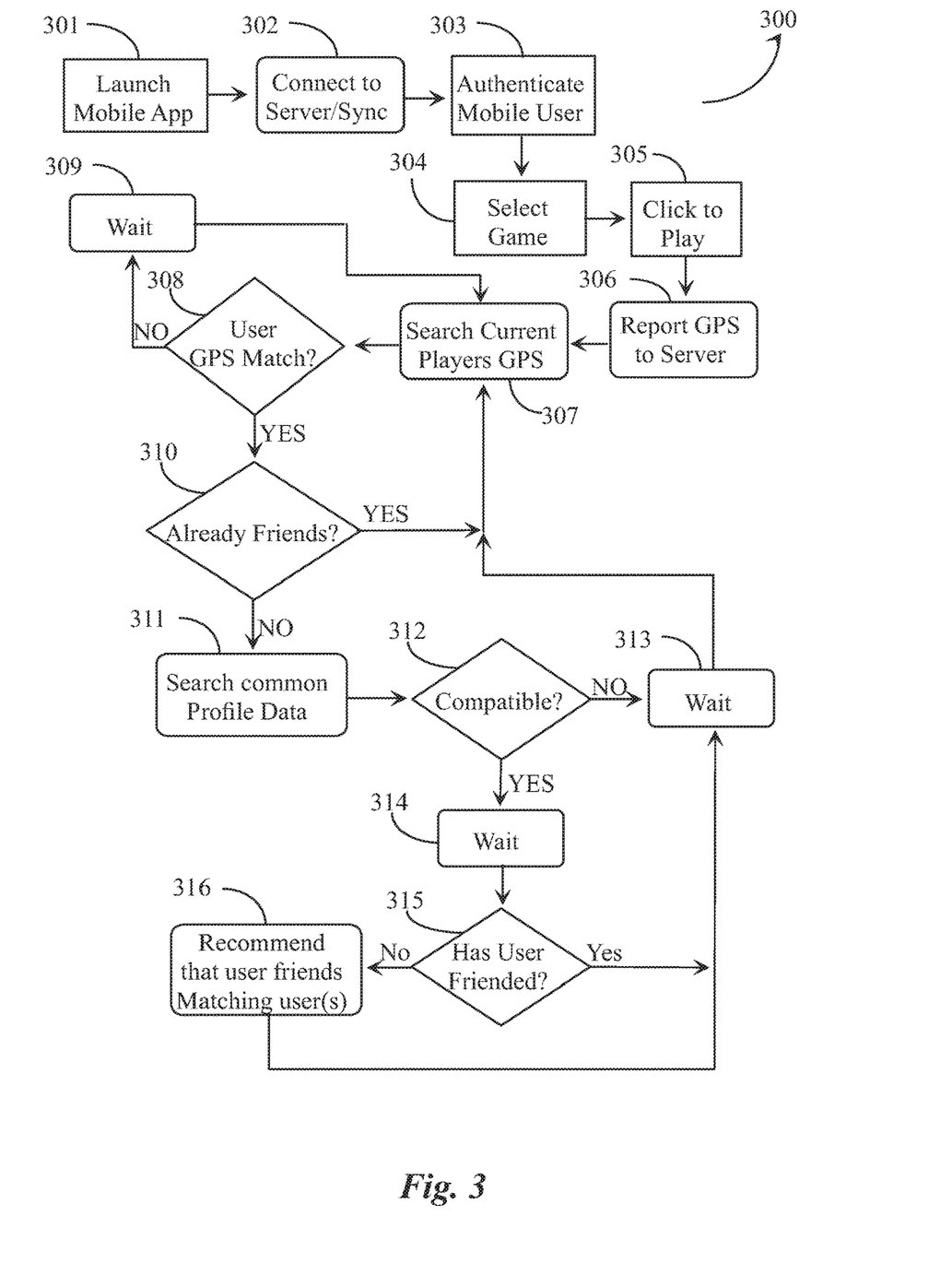
FIG. 3 is a process flow chart depicting steps for suggesting friendships for online players according to an embodiment of the present invention.

FIG. 3 is a process flow chart 300 depicting steps for suggesting friendships for online players according to an embodiment of the present invention. At step 300 a player may launch a mobile gaming application from a wireless network-capable device such as a gaming box, an iPhone, an Android device, or some other wireless device that is capable of online navigation and gaming. The device makes connection through the mobile application to an access point server such as a Website analogous to Website 112 of FIG. 1 running on server 113 at step 302.

The player may be authenticated at the server by general player name and password regime at step 303. Once authenticated, the player may select a game to play through the mobile application in step 304. In one aspect the player may also, in step 304, invoke preset play options for any game or, may select from presented play options for a particular game selected. At step 305 the player may click play to enter a selected game. Clicking play may, in one implementation, cause redirection of the player to a "geographically close" gaming server to begin playing the game. It is assumed herein that the player subject to this flow is "targeted" by the system for recommending friends once he or she has connected to the gaming server to play a game.

At step 306, the mobile application reports GPS coordinates of the player to the gaming server. These coordinates may be made part of the player's activity or "use" data that may be subscribed to by a back end data processing server similar to server 103 of FIG. 1. Step 306 may be practiced in a periodic manner, once and then again if coordinates change, or continually while the player engages in active game play.

At step 307, the service provider may take the targeted players GPS data and use it to search for other players having the same or proximal GPS coordinates as the targeted player. The search may be conducted through a SW application running on a back end data server such as SW 104 running on server 103. The search may be conducted in feed data coming into the back end server from the gaming server. In one implementation, other players that are currently playing games and have reported GPS coordinates are searched based on the original GPS report of the targeted player at step 307.

In one implementation the considered players for friendship may also include players that have recently played near the original GPS coordinates of the targeted player but are not playing at the same time as the targeted player. The use data or activity data containing the player's identities, GPS data, game played, etc. may span over a period of time such as, perhaps 24 hours, or some other set period for purging the history. In a preferred implementation a player is targeted when online and playing a game.

At step 308, it is determined whether there is one or more other players discovered in the use data that have GPS data matching that of the targeted player. In one implementation there may be a GPS radius or buffer set by the system for quantifying "proximity" wherein GPS coordinates falling outside of the GPS "perimeter" are not considered a match in search results. If there are no players having GPS match to the targeted player at step 308, the process may move to step 309 for a delay period or "wait" period before the process resolves back to step 307 for another search. The period may be arbitrary or preset. It is possible that the targeted player may drop off the grid between searches causing the system to abandon the process for that player. In another implementation, the system may still process for the targeted player after the player has logged off of the system owing to the fact that the player's data is recovered in the "use" or activity data.

If there are found to be one or more than one player having matching GPS to the targeted player, at step 308, the system may determine at step 310, the friendship status that might exist between the targeted players and any one of the matching players. This may be achieved by accessing the targeted player's current friends' data from the mobile application or from the Website, or from a database containing profile data that may also include friend data for all players currently or recently active in game play. If at step 310 the player or players found is or are already friends of the targeted player, the process may abandon them in the search results and the process may resolve back to step 307, perhaps after a waiting period.

If it is determined at step 310 that one or more of the GPS matching players are not already friends of the targeted player, the processing entity may search through the common profile data of those players for attributes that are similar to or shared by the targeted player. Attributes may include, but are not specifically limited to age, gender, online service affiliations, school, club membership, etc.

At step 312 it may be determined whether or not the player or players information and the targeted player's information are compatible to a point where friendship may be recommended. In one implementation an attribute model maybe used to determine from a number of available attributes for comparison between two players, the number of those that may be considered a match or "compatible" by a search algorithm. If determined at step 312 that there are no GPS matching players having a sufficient number of compatible attributes when compared with those of the targeted player, the process may move to wait at step 313 for a predetermined amount of time before launching another search at step 307.

If it is determined that one or more of the GPS matching players have sufficient shared attributes to be deemed compatible with the targeted player at step 312 the process may be moved to wait at step 314 for a predetermined period. This wait period may be initiated while the targeted player is online and playing a game and may be intended as a buffer period within which the system gives time for the targeted player to initiate any friend requests to any of the "found" players. After wait period 314, it may be determined at step 315 whether the targeted player has friended any of the "found" candidates. If at step 315 the player has not friended the one or more players deemed compatible for befriending at step 312, the system may recommend that the targeted player friends the GPS and attribute matching player or players. The recommendation may appear as a pop up notification in the targeted player's mobile application.

If the player has requested friendship from one of one or all found candidates, the process moves to wait back at step 313 before resuming a new search at step 307. A new search may or may not be initiated for the same targeted player. In one implementation a different player may be targeted. In one implementation multiple players may be targeted for friendship recommendations from the system during a same period of time. In one implementation if a targeted player does not friend a recommended player after getting a notification to do so, the targeted player may be notified once again at some future date and time wherein the recommended player will again be presented to the targeted player. In one implementation a targeted player may be offline before the system makes a friendship commendation. If so the recommendation may appear the next time the targeted player syncs with the server, the notification appearing in the mobile application.

Figure 4:
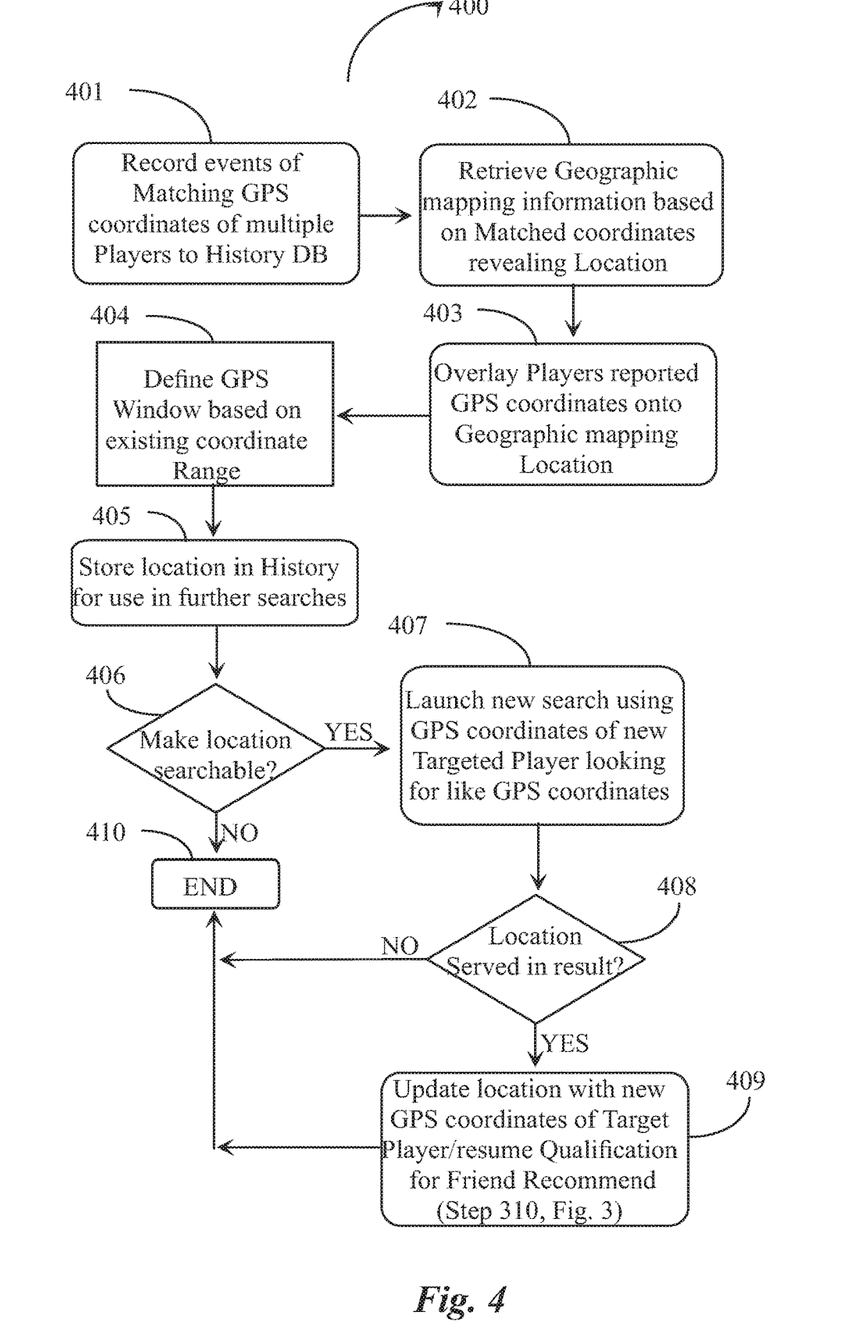
FIG. 4 is a process flow chart depicting steps of identifying locations associated with gaming clusters and incorporation of those locations identified into searchable data in an embodiment of the invention.

FIG. 4 is a process flow chart 400 depicting steps of identifying locations associated with gaming clusters and incorporation of those locations identified into the searchable data for finding like GPS coordinates of a targeted player. At step 401 the system aided by SW 104 may record into history any identified player clusters. A cluster may be interpreted as a number of game players having similar or proximal GPS coordinates that are currently active or have recently been active relative to game play at those coordinates.

At step 402, the service provider, more particularly, server 103 aided by SW 104 may submit the GPS coordinates of the cluster to a third-party mapping service analogous to mapping server 116 of FIG. 1. The map server may serve a geographic rendering (map) of the area containing the coordinates submitted with the identity of the local area, including place names of buildings, streets etc. revealed on the served map. At step 403 each of the submitted GPS coordinates may be overlaid on the mapping documentation in association with player identity for each mapped GPS coordinate.

At step 404 the system may define a GPS window based on the existing coordinate range and store the information as a geographic "hot spot" (where multiple players conjugate) in a history file or database at step 405. At step 406, it may be determined whether to render the stored location or cluster as searchable when new players are targeted that report like GPS coordinates. If at step 406 it is determined not to make the location searchable, the process may end for that created location at step 410.

If it is determined to make the location searchable at step 406, the location including the multiple players associated therewith may come up in a later search for GPS coordinates on behalf of a new targeted player having like GPS coordinates at step 407 (Step 307 FIG. 3). It may be determined at step 408 if the location identifying a hot spot comes up in search results. If the location is not served as a search result because the targeted player did not have a GPS signature within the range of that hot spot, the process may end for that location at step 410.

If at step 408, the location was served in the search results of the search in step 407, then the location may be updated with the new targeted player's GPS coordinates in step 409. The process may ten end for that location at step 410. The process of finding potential friends for the new targeted player may resume normally as described further above referring to step 310 of FIG. 3 through step 316. In one implementation the system may arbitrarily target a player having GPS previously reported in History and perform a search in the same History location to find GPS signatures from other players that are also recorded in the History without requiring any of the players to be currently online and playing a game.

In another implementation friending recommendations might be limited to those who are currently online and actively playing. In still another implementation active players may be targeted for GPS search and other active and recently active players that are not currently active may be included in the search. If a targeted player goes offline before a friend recommendation is sent, it may appear at the next time the player logs in with the mobile application.

It will be apparent to one with skill in the art that the friend recommendation system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will further be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A game system comprising:
one or more network-connected servers executing system software (SSW) on one or more processors from a non-transitory medium, providing virtual reality games for players logged in to the system to select and play; and
a plurality of mobile digital devices in use by players logged in to the system, associated by the system with individual player identity, executing a mobile application (MA) enabled to interact with the SSW, and equipped with GPS tracking;
wherein the MA reports GPS coordinates for individual ones of the plurality of players to the SSW periodically, the SSW identifies clusters of players based on pre-programmed geography limitations, maintains geographic information associated with GPS coordinates for a variety of enterprises and institutions, processes the cluster data as associated with specific enterprises and institutions, and, based on repetitive association of two players in a cluster associated with an institution, assumes that the two players are members of the institution, and uses the institution association together with compatibility of profile data to initiate a friendship recommendation.

2. The game system of claim 1 wherein one function of the SSW is to facilitate establishing formal friendship between players, and recommendations are made by the SSW to individual players regarding suitability of other players to be friended, based in part on the cluster data.

3. The game system of claim 2 wherein the recommendations are made to individual players through messages in real time to the mobile digital devices in use by the players.

4. The game system of claim 2 wherein the system maintains profile information for individual players, including but not limited to name, age, and gender, and wherein friendship recommendations are based on the profile information as well as cluster data.

5. The game system of claim 1 wherein the geographic information is provided by a third-party mapping service.

6. The game system of claim 1 wherein the SSW selects and targets a specific player, notes the specific player's GPS position, and searches GPS data for other players within a pre-programmed range of the targeted player.

7. A game system comprising:

one or more network-connected servers executing system software (SSW) on one or more processors from a non-transitory medium, providing virtual reality games for players logged in to the system to select and play; and a plurality of mobile digital devices in use by players logged in to the system, associated by the system with individual player identity, executing a mobile application (MA) enabled to interact with the SSW, and equipped with GPS tracking;

wherein the MA reports GPS coordinates for individual ones of the plurality of players to the SSW periodically, and the SSW identifies clusters of players based on pre-programmed geography limitations, and uses cluster data for various interactions between players and the system, and between players and other players, wherein one function of the SSW is to facilitate establishing formal friendship between players, recommendations are made by the SSW to individual players regarding suitability of other players to be friended, based in part on the cluster data, and wherein recommendations made comprise an interactive interface enabling a recipient of the recommendation to issue a friend request to the player recommended through a message to the device in use by the player recommended or through a different message channel.

8. The game system of claim 7 wherein a player receiving a plurality of friend recommendations from the system is enabled to select all or individual ones of the recommended players to issue group invitations.

9. A method comprising:

executing system software (SSW) on one or more processors in one or more network-connected servers from a non-transitory medium, providing virtual reality games for players logged in to the system to select and play;

tracking a plurality of mobile digital devices in use by players logged in to the system, associated by the system with individual player identity, the mobile devices executing a mobile application (MA) enabled to interact with the SSW, and equipped with GPS tracking;

reporting GPS coordinates for individual ones of the plurality of players to the SSW periodically, and identifying clusters of players based on pre-programmed geography limitations;

using cluster data for various interactions between players and the system, and between players and other players; and maintaining geographic information associated with GPS coordinates for a variety of enterprises and institutions, and processing the cluster data as associated with specific enterprises and institutions.

10. The method of claim 9 wherein the SSW facilitates establishing formal friendship between players, and makes recommendations to individual players regarding suitability of other players to be friended, based in part on the cluster data.

11. The method of claim 10 wherein the recommendations are made to individual players through messages in real time to the mobile digital devices in use by the players.

12. The method of claim 10 comprising maintaining profile information for individual players, including but not limited to name, age, and gender, and making friendship recommendations based on the profile information as well as cluster data.

13. The method of claim 10 comprising enabling a recipient of the recommendation to issue a friend request to the player recommended through a message to the device in use by the player recommended or through a different message channel.

14. The method of claim 13 comprising enabling a player to select all or individual ones of the recommended players to issue group invitations.

15. The method of claim 9 comprising using repetitive association of two players in a cluster associated with an institution, assuming that the two players are members of the institution, and using the institution association together with compatibility of profile data to initiate friendship recommendation.

16. The method of claim 9 comprising using geographic information provided by a third-party mapping service.

17. The method of claim 9 comprising selecting and targeting a specific player, noting the specific player's GPS position, and searching GPS data for other players within a pre-programmed range of the targeted player.

* * * * *